United States Patent
Malchow et al.

[11] Patent Number: 6,085,935
[45] Date of Patent: Jul. 11, 2000

[54] PRESSURE VESSEL DOOR OPERATING APPARATUS

[75] Inventors: Gregory L. Malchow, Oshkosh; Stephen L. Harris; Andrew Kegler, both of Ripon, all of Wis.

[73] Assignee: Alliance Laundry Systems LLC, Ripon, Wis.

[21] Appl. No.: 09/131,570

[22] Filed: Aug. 10, 1998

[51] Int. Cl.[7] .............................. B65D 51/04; F16J 13/16
[52] U.S. Cl. .......................... 220/813; 220/291; 220/816
[58] Field of Search ................................. 220/813, 820, 220/291, 263, 816, 811, 817, 821, 582

[56] References Cited

U.S. PATENT DOCUMENTS

| | | | |
|---|---|---|---|
| 941,452 | 11/1909 | Henning | 220/813 X |
| 1,028,499 | 6/1912 | Schott | 220/816 |
| 1,399,759 | 12/1921 | Fullenwider | 220/291 |
| 1,958,923 | 5/1934 | Mohler | 220/582 X |
| 4,157,763 | 6/1979 | Betlejewski et al. | 220/761 |
| 4,474,303 | 10/1984 | Maccise | 220/293 X |
| 5,467,492 | 11/1995 | Chao et al. | 8/159 |
| 5,651,276 | 7/1997 | Purer et al. | 68/5 C |

*Primary Examiner*—Allan N. Shoap
*Assistant Examiner*—Rodrigo L. Eichwald
*Attorney, Agent, or Firm*—Leydig, Voit & Mayer, Ltd.

[57] ABSTRACT

A pressure vessel which includes a door operating apparatus which enables a door to the pressure vessel to be moved between open and closed positions quickly and easily is provided. The door operating apparatus includes a translation rod supported on the pressure vessel for sliding movement relative to the housing of the pressure vessel such that the sliding movement of the translation rod guides the door in a direction perpendicular to the plane of the door opening in the housing between the open and closed positions. The translation rod further being supported on the pressure vessel for pivotal movement with respect to the pressure vessel housing so as to enable the door to pivot about an axis defined by the translation rod into a fully open position. A handle can also be pivotally connected in off-center relation to a front face of the door for movement between a retracted position wherein the handle is arranged substantially adjacent to the front face of the door and an extended position wherein the handle extends away from the front face of the door and towards an outer periphery of the door.

22 Claims, 3 Drawing Sheets

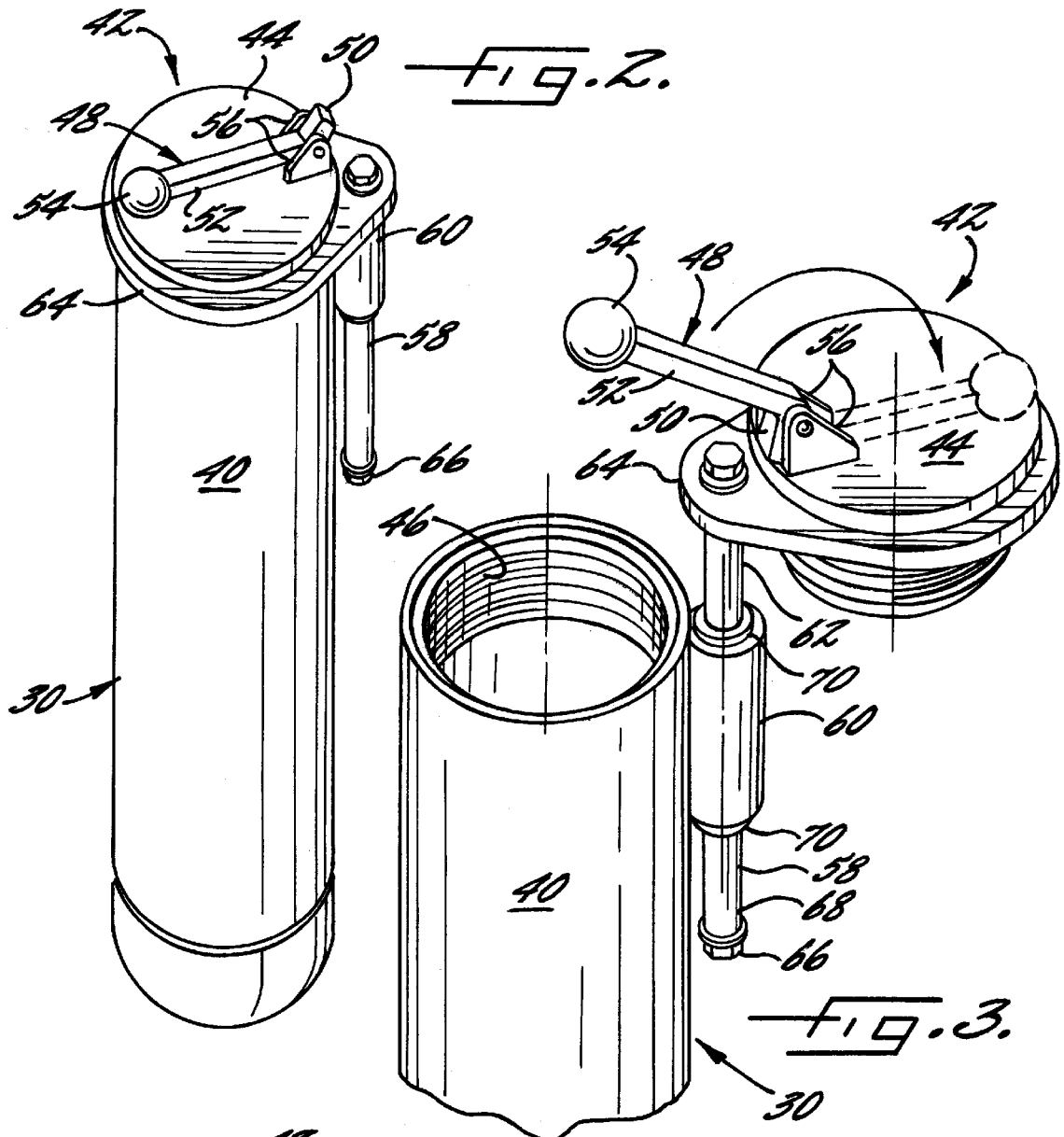
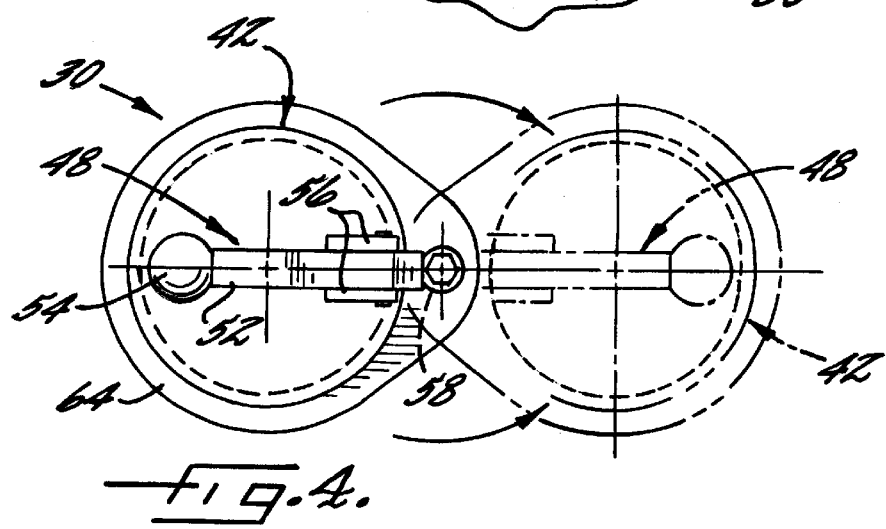

PRESSURE VESSEL DOOR OPERATING APPARATUS

FIELD OF THE INVENTION

This invention generally relates to pressure vessels and, more particularly, to an apparatus for enabling easy operation of a door of a pressure vessel, such as the door of a pressure vessel used in a liquid carbon dioxide dry cleaning system.

BACKGROUND OF THE INVENTION

Known dry-cleaning processes consist of wash, rinse, and drying cycles. Garments are loaded into a basket in a cleaning drum and immersed in a dry-cleaning fluid or solvent, which is pumped into the cleaning drum from a base tank. Conventional dry-cleaning fluids include perchloroethylene (PCE), petroleum-based or Stoddard solvents, CFC-113, and 1,1,1-trichloroethane, all of which are generally aided by a detergent. The solvent is used to dissolve soluble contaminants, such as oils, and to entrain and wash away insoluble contaminants, such as dirt.

The use of these conventional solvents, however, poses a number of health and safety risks as well as being environmentally hazardous. For example, halogenated solvents are known to be environmentally unfriendly, and at least one of these solvents, PCE, is a suspected carcinogen. Known petroleum-based solvents are flammable and can contribute to the production of smog. Accordingly, dry-cleaning systems which utilize dense phase fluids, such as liquid carbon dioxide, as a cleaning medium have been developed. An apparatus and method for employing liquid carbon dioxide as the dry-cleaning solvent is disclosed in U.S. Pat. No. 5,467,492, entitled "Dry-Cleaning Garments Using Liquid Carbon Dioxide Under Agitation As Cleaning Medium". A similar dry-cleaning apparatus is also disclosed in U.S. Pat. No. 5,651,276.

These systems pose a number of other problems, particularly in relation to the high operating pressures necessary for maintaining the gas in a liquid state. Specifically, the cleaning vessel in a liquid carbon dioxide system operates at between 500–850 psi under ambient temperature conditions. In addition to the cleaning vessel, the dry-cleaning apparatus has a number of other vessels or chambers associated with the regular operation and maintenance of the system which are regularly exposed to elevated pressures. Because of the high operating pressures, the doors, access panels, hatches and the like associated with the various pressure vessels in the system have relatively bulky heavy-walled constructions. A number of these pressure vessels or chambers contain filters and cleanout areas, such as for example the lint filter, which should be accessed on a regular basis for routine cleaning or maintenance, sometimes as frequently as after the completion of each laundry load. In order to encourage regular cleaning of these filters and clean-out areas, they should be readily accessible to an operator. While the size and weight of the main door on the cleaning vessel requires the provision of an automated opening and closing mechanism, the smaller doors such as the lint filter access door are generally intended to be operated manually. However, because of the bulky heavy-walled construction of these doors, they can be cumbersome to handle and can require a significant amount of physical strength to operate.

These difficulties can make it inconvenient for an operator to open such pressure vessels or chambers and, in the case of the lint filter, can discourage the operator from checking and cleaning the lint filter as frequently as is needed to ensure optimal operation of the dry cleaning system. For example, doors which are used on smaller pressure vessels, such as the lint filter in a liquid carbon dioxide dry cleaning system, commonly are designed for threaded closing engagement. In particular, the door is moved between open and closed positions, by threading the door into and out of engagement with a complementary threaded opening in the pressure vessel. However, the weight of the door can make it difficult to rotate, often necessitating the use of a separate tool. As will be appreciated, using a separate tool to open the door can be time consuming and awkward resulting in misapplication of the tool. Moreover, the separate tool can easily become misplaced or lost. In the context of the access door to the lint filter, this can make checking the filter on a regular basis even more inconvenient for an operator. Additionally, once the door is removed from the filter housing in order to gain access to the lint filter, the door itself must be manually set aside so that the operator can check and, if necessary, clean the lint filter.

Difficulties also can arise when closing the filter access door. Specifically, in order to ensure that the lint filter housing is tightly sealed, the door must be aligned to properly engage the complementary threads in the opening in the filter housing. Because of the weight of the door, this can be a quite cumbersome and frequently time-consuming operation. If the threads are not properly engaged, of course, it can result in a potentially hazardous leak of high pressure carbon dioxide.

OBJECTS AND SUMMARY OF THE INVENTION

Accordingly, in view of the foregoing, it is a general object of the invention to overcome the problems associated with the use of a conventional manually operable door apparatus on pressure vessels which must be opened on a regular basis.

A further object of the present invention is to provide an apparatus for operating threaded pressure vessel doors which allows the door to be moved between open and closed positions quickly and easily.

A related object of the present invention is to provide a door operating apparatus as characterized above which ensures that the door is properly aligned as the door moves between the open and closed positions.

Another object of the present invention is to provide a door operating apparatus of the foregoing type which permits unobstructed access to the interior of the pressure vessel while retaining the door, in a ready position, so that it cannot become misplaced.

These and other features and advantages of the invention will be more readily apparent upon reading the following description of a preferred exemplary embodiment of the invention and upon reference to the accompanying drawings wherein:

BRIEF DESCRIPTION OF THE DRAWINGS

FIG. 2 is a perspective view of the lint filter of the illustrative dry-cleaning apparatus showing the lint filter access door in the closed position.

FIG. 3 is an enlarged partial perspective view of the lint filter showing the door operating apparatus with the handle in the extended position and the door in a pivoted open position.

FIG. 4 is a top plan view of the lint filter showing the door operating apparatus with the door in the closed position in solid lines and the door in the pivoted open position in phantom lines.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
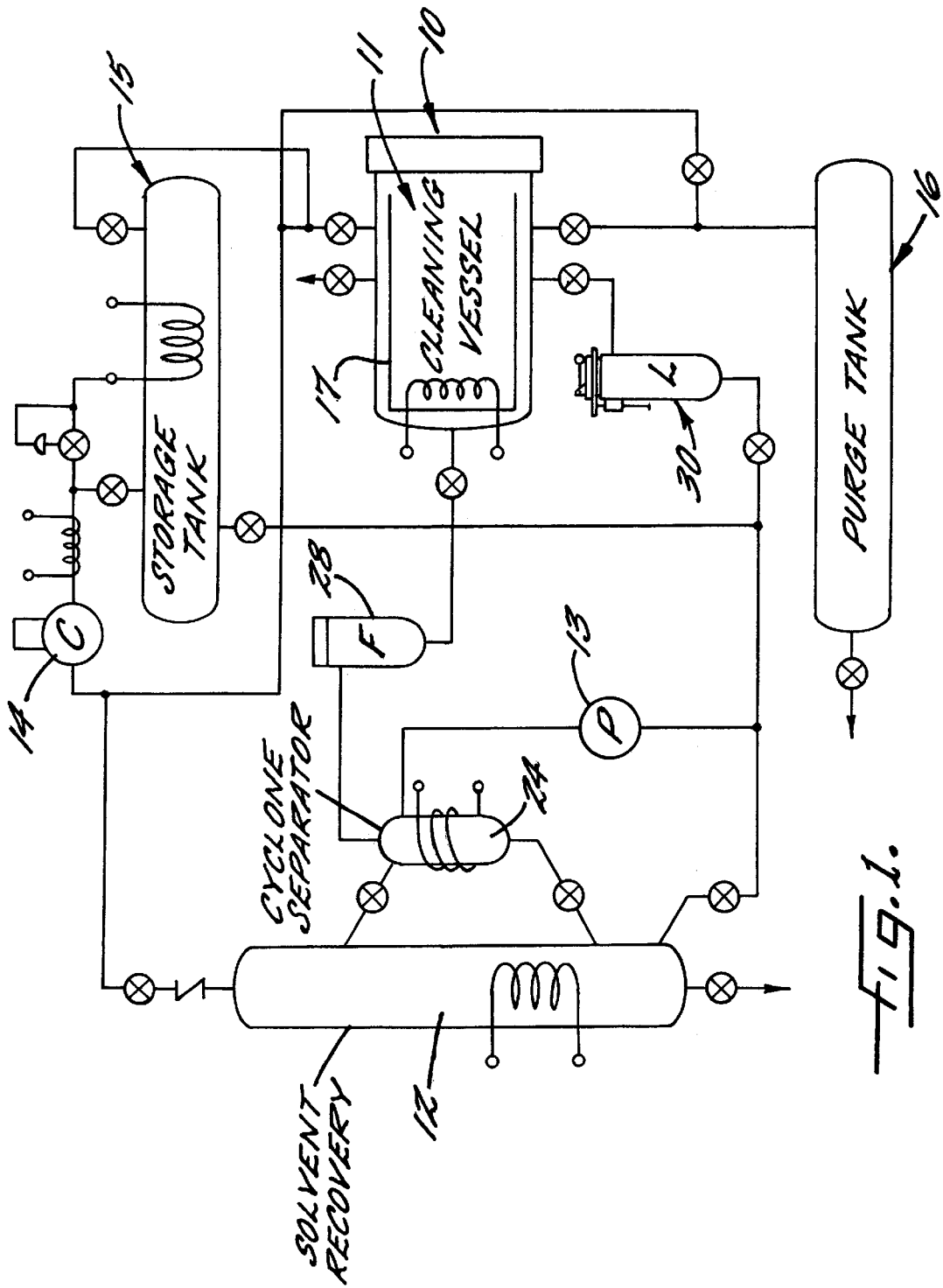
FIG. 1 is a schematic block diagram of an illustrative dense phase liquid dry-cleaning apparatus having a cleaning vessel and an associated lint filter which is equipped with a door operating apparatus in accordance with the present invention.

Referring now more particularly to FIG. 1, there is shown a schematic block diagram of an illustrative dry-cleaning apparatus 10 which includes an associated pressure vessel in accordance with the present invention. The illustrative dry-cleaning apparatus 10 utilizes liquid carbon dioxide as the dry-cleaning solvent in the same manner as the dry-cleaning system described in commonly assigned U.S. application Ser. No. 08/998,394, filed Dec. 24, 1997, the disclosure of which is hereby incorporated in its entirety by reference. The major components of the dry-cleaning apparatus 10 include a substrate cleaning vessel 11, a solvent recovery device 12, a pump 13 and a compressor 14 all of which may be of a conventional type. The dry cleaning apparatus 10 also includes a storage tank 15 for the supply of liquid carbon dioxide to the cleaning vessel 11 and a purge tank 16.

To begin the dry-cleaning process, soiled garments or other items to be dry cleaned are deposited in a perforated rotatable basket 17 which is supported in the cleaning vessel 11. The vessel is then charged with liquid carbon dioxide from the pressurized storage tank 15 in order to initiate the wash cycle. During the dry-cleaning process, the desired pressure in the cleaning vessel 11 ranges from about 700 psi to about 850 psi.

Once the wash and rinse cycles have been completed, the now contaminated liquid carbon dioxide is drained from the cleaning vessel during a drying/draining cycle. For removing contaminants from the liquid carbon dioxide during the wash and rinse cycles, the liquid carbon dioxide preferably is cycled from the cleaning vessel 11 to the solvent recovery device 12 which functions to vaporize the liquid carbon dioxide to separate and concentrate the particulates. During such processing, the clean gaseous carbon dioxide is directed to a condenser where it is reliquified and then returned to the storage tank 15. The liquefied carbon dioxide is circulated through the apparatus by the pump 13. For removing gaseous carbon dioxide from the cleaning vessel 11, a compressor 14 is provided to pump gaseous carbon dioxide from the cleaning vessel 11 to a condenser where it is condensed back into liquid phase and then redirected to the storage tank 15.

For removing non-soluble contaminants from the liquid carbon dioxide, the liquid carbon dioxide is circulated through a filtration system including, in the illustrated embodiment, a cyclone separator 24, a machine filter 28 and a lint filter 30. Both the lint filter 30 and the machine filter 28 are arranged, in this instance, such that they are in communication with the interior of the cleaning vessel and thus are exposed to relatively high pressures when the cleaning vessel is pressurized with carbon dioxide. As shown in FIGS. 2–6 the lint filter 30 includes a generally cylindrical filter housing 40 within which a conventional filter media 32 can be removably mounted. In one preferred embodiment, the filter housing is equipped with a removable inner basket which allows for easy access and additionally to provide a container within which detergent, surfactant, soap or the like may be dissolved into the cleaning solution as the wash cycle progresses. In order to permit access to the interior of the lint filter housing 40 for routine maintenance and cleaning of the lint filter, a manually operable access door 42 is provided. Those skilled in the art will appreciate that the machine filter 28 can have a generally similar construction.

As will be appreciated, because of the pressures encountered during the dry-cleaning process, the various vessels and chambers which are utilized in the system have a heavy walled construction. Likewise, the doors, hatches, access panels and the like which are associated with such pressure vessels and chambers are relatively heavy and bulky and thus can be awkward and cumbersome to handle and require a significant amount of physical strength to operate. A number of these pressure vessels or chambers, such as the lint filter 30 and the machine filter 28, contain filters or clean-out areas, the interior of which preferably should be accessed on a regular basis for cleaning and maintenance, potentially as frequently as after the completion of each dry-cleaning load. However, the difficulties associated with the handling of the heavy and bulky doors to these pressure vessels can make it inconvenient for an operator to access these areas, thereby discouraging the operator from checking these areas as often as may be required to ensure optimal operation of the dry-cleaning apparatus.

In accordance with an important aspect of the invention, for enabling the door to such a pressure vessel to be moved quickly and easily between the open and closed positions, a door operating apparatus is provided which eliminates the awkward and cumbersome handling which otherwise would be associated with the operation of the heavy walled door. To this end, in the illustrated embodiment, a door operating apparatus is provided on the lint filter 30 which is adapted to assist and guide movement of the lint filter access door 42 between the open and closed positions. In this case, the filter access door 42 is adapted for threaded engagement with an opening 46 in an end of the filter housing. As will be described in greater detail below, the access door 42 to the lint filter 30 is opened simply by rotatably drawing the door out of threaded engagement with the opening 46 in the filter housing.

In carrying out the invention, to facilitate the rotary movement necessary to move the access door 42 between the open and closed positions and to substantially reduce the amount of force required to operate the filter access door, a handle 48 is provided on the front face 44 of the access door. As will be appreciated, the handle 48 eliminates the need for an operator to use a separate tool to grasp and turn the door which potentially can be misapplied causing damage to the door. In this instance, the handle 48 comprises an L-shaped member having a first relatively shorter leg 50 and a second relatively longer leg 52 which are interconnected in perpendicular relation. To facilitate grasping of the handle 48 by an operator, a grip 54 having a spherical configuration is arranged on an end of the second leg 52.

In order to prevent the handle 48 from becoming an obstruction around which clearance must be provided even when the handle is not in use, the handle is pivotally attached to the front face 44 of the access door 42 such that the handle may be selectively deployed into an operative position only when needed. Specifically, in the illustrated embodiment, the first leg 50 of the handle is pivotally connected to a mounting flange 56, which is arranged eccentrically on the front face 44 of the access door 42, such that the handle 48 is movable between extended and retracted positions as shown in FIG. 3. In the retracted position, as shown by phantom lines in FIG. 3, the second leg 52 of the handle is arranged adjacent and generally parallel to the front face 44 of the door 42 such that the second leg extends generally across the front face of the door so as to minimize the profile of the handle. Accordingly, when not in use, the handle 48 can be stored in the retracted position in order to substantially eliminate it is a potential obstruction. When the handle 48 is needed to assist in either opening or closing the door 42, the handle can be moved from the retracted to the extended position, by pivoting the second leg 52 away from the front face 44 of the door. When in the fully extended position, as shown by solid lines in FIG. 3, the second leg 52 of the handle extends outwardly beyond the periphery of the door 42 at an angle relative to the front face 44 of the door. As will be appreciated, in this position, the handle 48 can be easily grasped by an operator in order to gain increased leverage for rotating the door 42. In this case, the first leg 50 of the handle functions as a stop which prevents further pivotal movement of the handle 48 once the first leg 50 engages the front face 44 of the door.

Figure 5:
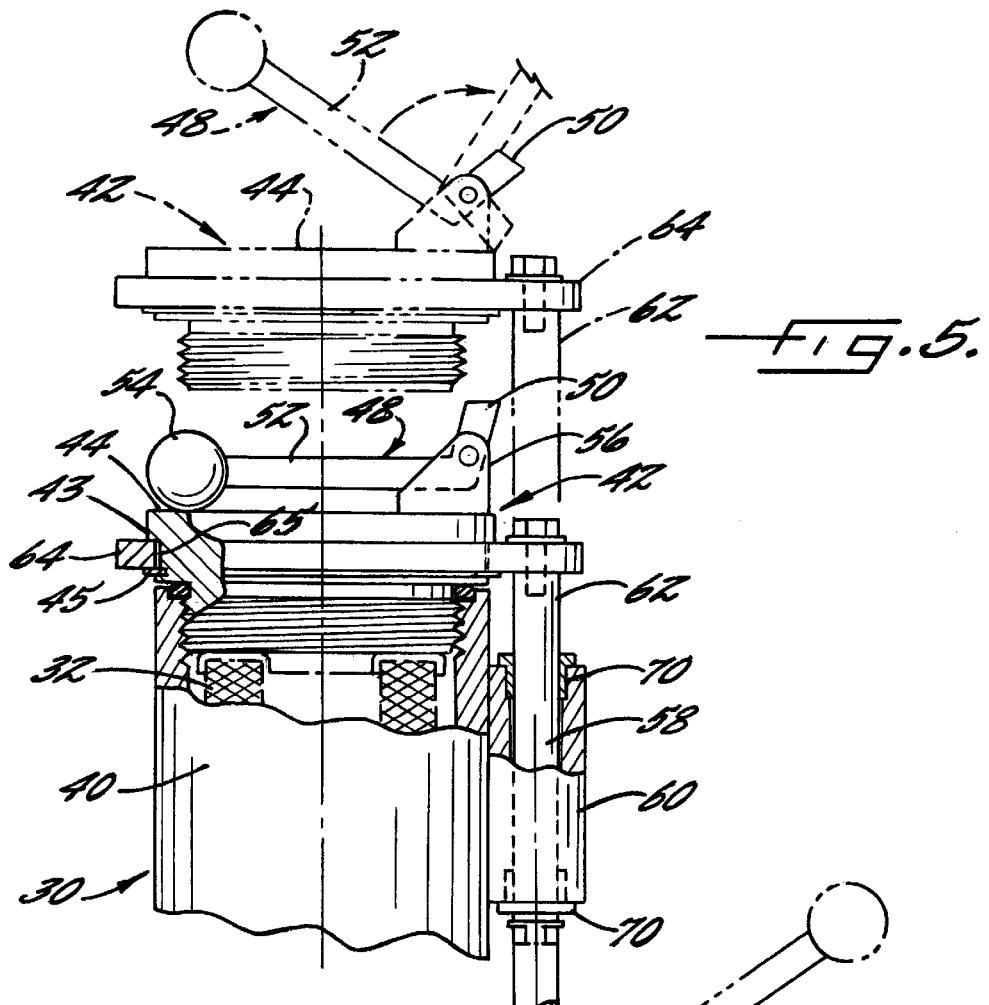
FIG. 5 is a side elevation view in partial cross section of the lint filter showing the door operating apparatus with the door in the closed position in solid lines and with the door in an intermediate partially open position in phantom lines.

In accordance with a further aspect of the invention, for further facilitating operation of the filter access door 42, a translation rod assembly is arranged on the filter housing 40 which carries and guides the access door as it moves between the open and closed positions. Specifically, the translation rod assembly ensures that the access door 42 is properly aligned with the opening in the filter housing as the door moves between the open and closed positions so that the complementary threads on the opening 46 and the access door 42 properly engage when the door is closed to provide a pressure tight seal. Additionally, the translation rod assembly also serves to retain the access door 42 on the filter housing 40 when the door 42 is in the open position so that the door cannot be inadvertently misplaced or lost by an operator. In the illustrated embodiment, the translation rod assembly includes a translation rod 58 which is mounted to the filter housing 40 via a mounting sleeve 60 which is attached to the outer surface of the filter housing adjacent the opening 46. More particularly, the mounting sleeve 60 receives and carries the translation rod 58 for longitudinal sliding movement relative to the filter housing 40. A first end 62 of the translation rod 58 is attached to an annular flange 64 which defines an opening 65 within which the access door 42 is rotatably mounted so as to enable the access door to be rotatably moved into and out of threaded engagement with the opening 46 in the filter housing 40. As shown in FIG. 5, the access door 42 is retained in an axial position within the opening 65 in the flange 64 by a shoulder 43 arranged on the door and a locking ring 45 which engage opposing sides of the access door 42. To limit sliding movement of the translation rod 58 and to help retain the translation rod in the sleeve member 60, a bolt 66 is arranged on a second end 68 of the translation rod as shown in FIGS. 2 and 3.

To ensure proper alignment of the access door 42 relative to the opening 46 in the filter housing, the mounting sleeve 60 is arranged such the translation rod 58 extends and slides in a direction parallel to the thread axes of the access door 42 and the opening 46. Accordingly, when the door 42 is rotatably drawn out of threaded engagement with the opening 46 in order to open the door, the movement of the door out of the opening slides the translation rod 58 which, in turn, guides movement of the door in the direction of the thread axes. Likewise, when the access door 42 is rotatably threaded back into the closed position, the translation rod 58 ensures that the thread axes of the door and the opening 46 are aligned for proper thread engagement. As will be appreciated, the guiding performed by the translation rod 58 eliminates the cumbersome and time-consuming handling which, because of the weight of the access door 42, is otherwise associated with aligning the threads of the door and the opening.

Figure 6:
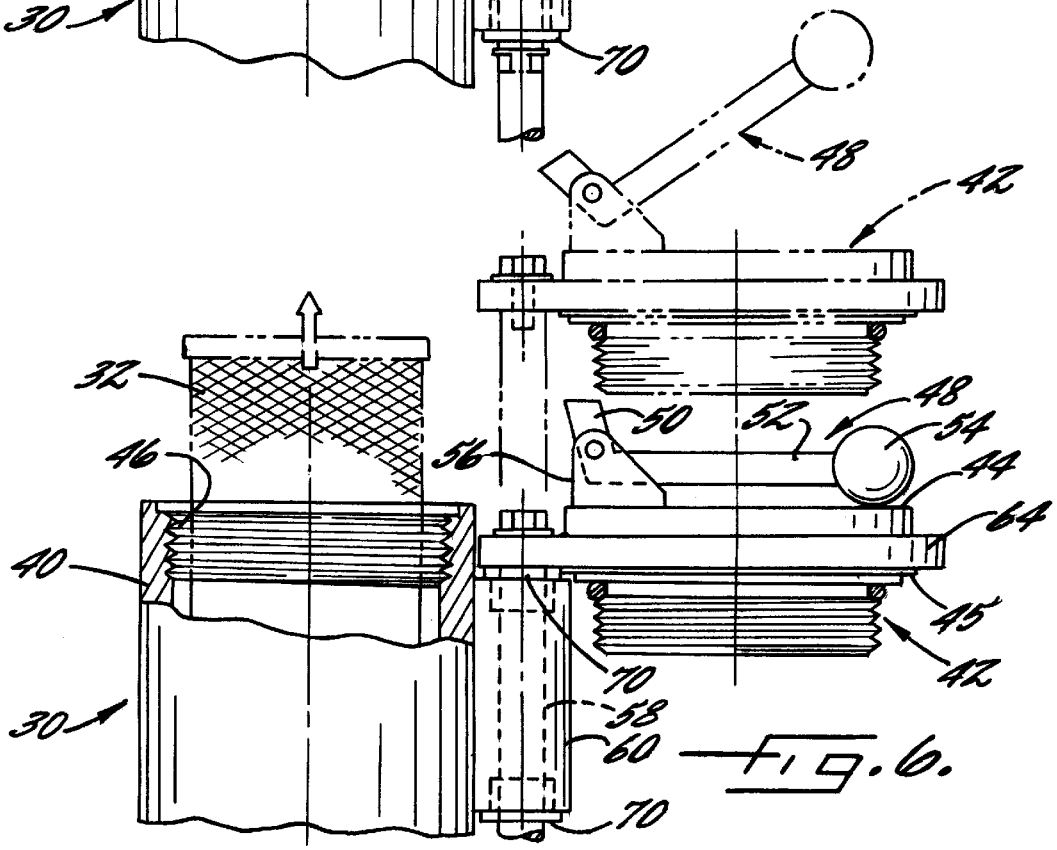
FIG. 6 is a side elevation view similar to FIG. 5 showing the door operating apparatus with the door pivoted into a fully open position as shown by the phantom and solid lines.

For allowing unobstructed access to the interior of the filter housing 40 when the access door 42 is opened and to minimize the amount of space consumed by the open door, the translation rod assembly enables the door to be pivoted away from the filter housing 40 into a fully open position. More particularly, as shown in FIGS. 5–6, the translation rod assembly enables the access door 42 to be first moved away from the filter housing, in this instance in the direction of the thread axes of the opening 46 and door 42, into an intermediate partially open position and then to be pivoted into a fully open position about an axis defined by the translation rod 58 into a fully open position. To this end, the translation rod 58 is rotatably supported in the mounting sleeve 60 by a pair of bearings 70 which are arranged at either end of the mounting sleeve. The bearings 70 enable the translation rod 58 to rotate about its longitudinal axis relative to the mounting sleeve 60 which, in turn, allows the door to be pivoted laterally relative to the opening 46 in the housing into the fully open position. As shown by solid lines in FIG. 6, when the access door 42 is placed in the fully open position, it is arranged to the side of the opening 46 in the filter housing 40. Thus, an operator has full access to the interior of the filter housing 40 in order to check, and as necessary clean, the lint filter. Moreover, since the access door 42 pivots in a plane parallel to the plane of the opening, there is no need to provide substantial additional clearance in front of the lint filter 30 for the operation of the access door 42.

From the foregoing it can be seen that an operating mechanism is provided for a pressure vessel door which enables the door to be moved between the open and closed positions quickly and easily while retaining the door such that it cannot become misplaced. Thus, the operating apparatus makes checking and cleaning out areas which must be accessed on a regular basis, such as the lint filter door in a dry cleaning apparatus, a relatively easy task. While the present invention has been described in connection with the access door to the lint filter of the illustrated dry cleaning system, it will be readily appreciated that is applicable to any pressure vessel in which ease of opening is a concern. Moreover, it will be appreciated that while the present invention is described in connection with a threaded door it also applicable to other types of doors, hatches, access panels and the like including, for example, those which are secured by pins, latches or the like.

What is claimed is:

1. A pressure vessel comprising:
    a wall structure which defines an interior space of said pressure vessel, said wall structure having an access opening,
    a removable door for closing said access opening, said door being mounted for movement in a first direction perpendicular to a plane of said access opening from a closed position to an intermediate open position, said door being supported by a support flange which defines an opening within which said door is rotatable mounted, said door and wall structure having complementary threads such that said door is movable between said closed and intermediate open positions by rotating the door into and out of threaded engagement with said opening, a translation rod mounted on said pressure vessel, said door support flange being connected to said translation rod at a fixed pivot location on said flange; said translation rod being supported on said pressure vessel for sliding movement to guide movement of said flange and the door mounted therein in said first direction of movement as said door is moved between said closed and intermediate open positions and for supporting said flange and the door mounted therein for pivotal movement about said fixed pivot location on said flange relative to said wall structure for moving said door between said intermediate open position and a fully open position to enable access to said interior space through said opening.

2. The pressure vessel according to claim 1 wherein said translation rod is supported on said pressure vessel by a sleeve member which slidingly receives said translation rod.

3. The pressure vessel according to claim 2 wherein said translation rod is rotatably supported in said sleeve member by at least one bearing.

4. The pressure vessel according to claim 2 wherein said sleeve member is arranged on an outer surface of said wall structure.

5. The pressure vessel according to claim 1 wherein said opening of said support flange is annular.

6. The pressure vessel according to claim 5 wherein said translation rod is connected to said annular flange.

7. The pressure vessel according to claim 1 further including a handle arranged on a front face of the door.

8. The pressure vessel according to claim 7 wherein said handle is attached to said front face of said door in off-center relation.

9. The pressure vessel according to claim 8 wherein said handle is pivotally attached to said front face of said door for movement between a retracted position and an extended position.

10. A pressure vessel comprising:
  a wall structure which defines an interior space of the pressure vessel,
  a door movable between open and closed positions so as to permit access to said interior space through an opening in said wall structure, said door being threaded and said opening in the wall structure including complementary threads such that said door is moveable between said closed and open positions by rotatably moving the door into and out of threaded engagement with said opening, and
  a handle pivotally connected to a front face of said door for movement between a retracted position adjacent to the front face of the door and an operative position extending beyond the outer periphery of said door for facilitating rotational movement of said door relative to said opening.

11. The pressure vessel according to claim 10 in which said handle is mounted in off-center relation to a front face of said door.

12. The pressure vessel according to claim 11 herein said door is threaded and said opening in the wall structure includes complementary threads.

13. The pressure vessel according to claim 12 wherein said handle is pivotally connected to said front face of the door adjacent said outer periphery of said door.

14. A pressure vessel comprising:
  a wall structure which defines an interior space of the pressure vessel,
  a door movable between open and closed positions so as to permit access to said interior space through an opening in said wall structure,
  said door being in threaded engagement with said opening and being movable between closed and open positions in response to rotational movement of said door relative to said wall structure, and
  a handle pivotally mounted on said door for movement between a retracted stored position adjacent a front face of said door and an operative position extending outwardly beyond the periphery of said door to facilitate rotational movement of said door between closed and opened positions.

15. The pressure vessel according to claim 14 in which said handle is mounted in off-center relation to said door.

16. The pressure vessel according to claim 14 in which said door is supported on a translation rod which guides movement of said door between closed and opened positions.

17. The pressure vessel according to claim 16 in which said rod is mounted on said wall structure for enabling pivotal movement of said door relative to said wall structure.

18. A pressure vessel comprising:
  a wall structure which defines an interior space of said pressure vessel, said wall structure having an access opening,
  a removable door for closing said access opening, said door being mounted for movement in a first direction perpendicular to a plane of said access opening from a closed position to an intermediate open position, said door being mounted for pivotal movement relative to said wall structure from said intermediate position to a fully opened position to enable access to said interior space through said opening, and
  a handle pivotally attached in off center relation to a front face of said door for movement between a retracted position substantially adjacent to the front face of said door and an operative position extending away from said front face towards an outer periphery of said door.

19. A pressure vessel comprising:
  a wall structure which defines an interior space of the pressure vessel,
  a door movable between open and closed positions so as to permit access to said interior space through an opening in said wall structure, said door being threaded and said opening in the wall structure including complementary threads such that said door is moveable between said closed and open positions by rotatably moving the door into and out of threaded engagement with said opening, and
  a handle pivotally connected to a front face of said door adjacent an outer periphery of said door for movement between a retracted position wherein said handle is arranged substantially adjacent to the front face of the door and an extended position wherein said handle extends beyond the outer periphery of said door.

20. The pressure vessel according to claim 11 wherein said handle has a generally L-shaped configuration including a relatively longer first leg and a relatively shorter second leg.

21. A liquified gas dry cleaning system comprising a cleaning vessel for containing items to be cleaned, a storage tank for storing a supply of a liquified gas cleaning solvent for supply to said cleaning vessel during a cleaning cycle, at least one auxiliary pressure vessel adapted for fluid communication with said cleaning vessel and for receiving the liquified gas cleaning solvent, said pressure vessel having a wall structure which defines an interior space and an access opening to said auxiliary pressure vessel, a removable door for closing said access opening, said door being supported by a support flange which defines an opening within which said door is rotatably mounted, said door being formed with external threads and said wall structure opening having complementary threads such that said door is movable between a closed position closing said opening and an intermediate opened position as an incident to rotating said door relative to said wall structure, a translation rod supported by said wall structure, said door support flange being connected to said translation rod at a fixed pivot location on said flange, and said translation rod being supported for sliding movement to guide movement of said flange as said door is moved between said closed and intermediate positions and for supporting said flange and the door supported thereby for pivotal movement about said fixed pivot location on said flange relative to said wall structure for moving said door between said intermediate and a fully opened position which enables access to the interior space through said opening.

22. The liquified gas dry cleaning system of claim 21 including a handle attached to a front face of said door for movement between a retracted stored position adjacent said front face and an extended position outwardly of said front face for facilitating rotational movement of said door between said closed and intermediate positions.

* * * * *